US012552234B2

(12) United States Patent
van Boxtel et al.

(10) Patent No.: US 12,552,234 B2
(45) Date of Patent: Feb. 17, 2026

(54) ROOF SYSTEM FOR A VEHICLE (71) Applicant: INALFA ROOF SYSTEMS GROUP B.V., Oostrum (NL)

(72) Inventors: Eduardus Christianus Henricus van Boxtel, Zeeland (NL); Matheus Simon Wilhelmus Ruiter, Melick (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 448 days.

(21) Appl. No.: 18/329,114

(22) Filed: Aug. 31, 2023

(65) Prior Publication Data
US 2023/0415552 A1 Dec. 28, 2023

(51) Int. Cl.
*B60J 7/047* (2006.01)
*B60J 7/02* (2006.01)
*B60J 7/043* (2006.01)
*B60J 7/057* (2006.01)
*E05D 15/30* (2006.01)
*E05D 15/56* (2006.01)
*E05F 15/655* (2015.01)

(52) U.S. Cl.
CPC ............ *B60J 7/0435* (2013.01); *B60J 7/024* (2013.01); *B60J 7/043* (2013.01); *B60J 7/0573* (2013.01); *E05D 15/30* (2013.01); *E05D 15/565* (2013.01); *E05F 15/655* (2015.01); *E05Y 2201/434* (2013.01); *E05Y 2201/626* (2013.01); *E05Y 2201/638* (2013.01); *E05Y 2201/64* (2013.01); *E05Y 2201/684* (2013.01); *E05Y 2900/542* (2013.01)

(58) Field of Classification Search
CPC . B60J 7/0435; B60J 7/024; B60J 7/053; B60J 7/0573; B60J 7/043; E05D 15/30; E05D 15/565; E05D 15/655; E05Y 2900/542
USPC ................................ 296/216.2–5, 222, 223
See application file for complete search history.

(56) References Cited

U.S. PATENT DOCUMENTS

| 7,828,376 | B2 | 11/2010 | Nellen | |
| 8,857,903 | B2* | 10/2014 | Nellen | B60J 7/024 296/220.01 |
| 2009/0179462 | A1 | 7/2009 | Nellen | |

FOREIGN PATENT DOCUMENTS

| DE | 3802380 A1 | 8/1988 |
| DE | 9302762 U1 | 4/1993 |

(Continued)

*Primary Examiner* — Dennis H Pedder
(74) *Attorney, Agent, or Firm* — Steven M. Koehler; Westman, Champlin & Koehler, P.A.

(57) ABSTRACT

A roof system for a vehicle, comprises a movable roof panel for a roof opening. Stationary guide rails slidably guide an operating mechanism that operates the panel. The operating mechanism comprises a first device for moving the panel rear edge towards a raised position and a second device including a lever for moving the panel front edge in a vertical direction. A guiding slide is driven to move the panel both vertically and horizontally through the first and second devices. The lever comprises a first pivotal connection to the panel, and, remote from that spaced second and third connections. The third connection connects the lever to the guiding slide. A fourth connection on the lever is arranged near the third connection and connects the lever to the guiding slide when the third connection is disconnected from the guiding slide during a movement of the front edge of the panel upwardly.

16 Claims, 7 Drawing Sheets (56) References Cited

FOREIGN PATENT DOCUMENTS

| | | | |
|---|---|---|---|
| DE | 19713347 | C1 | 5/1999 |
| DE | 10348545 | A1 | 5/2005 |
| DE | 102004018461 | A1 | 11/2005 |
| DE | 102005007031 | A1 | 8/2006 |
| EP | 0381066 | A2 | 8/1990 |
| EP | 1741588 | A1 | 1/2007 |
| EP | 1790515 | A1 | 5/2007 |
| EP | 2078630 | A1 | 7/2009 |
| FR | 2726512 | A1 | 5/1996 |
| NL | 1014023 | C2 | 7/2001 |
| WO | 2006086955 | A1 | 8/2006 |
| WO | 2007079747 | A1 | 7/2007 |

\* cited by examiner

ROOF SYSTEM FOR A VEHICLE

BACKGROUND

The discussion below is merely provided for general background information and is not intended to be used as an aid in determining the scope of the claimed subject matter.

Aspects of the invention relate to a roof system for a vehicle having a roof opening in a roof part thereof. At least a closure is movable between a closed position in which it closes the roof opening and an open position in which it opens the roof opening and is positioned at least partially above an adjoining portion of the roof part. A stationary guide rail is disposed at each longitudinal side of said roof opening, suitable for slidably guiding an operating mechanism that operates the closure in a longitudinal direction of the vehicle.

The operating mechanism comprises a first device for moving the rear edge of the closure towards a raised position relative to the closed position and above the adjoining roof part, a second device including a lever for moving the front edge of the closure in a vertical direction, and a guiding slide which is slidably accommodated in each guide rail and is drivable by a drive member in order to move the closure both in vertical and in horizontal direction through the first and second devices. The lever comprises, at a first end, a first pivotal connection to the closure, and, remote from the first end, spaced second and third connections, at least the third connection connecting the respective lever at least to the guiding slide in order to enable control of the movements of said lever.

In this prior art system, the lever of the front device is guided with its third connection by a pin engaging a guide curve in the guiding slide and with its second connection by an auxiliary sliding member sliding in the stationary guide rail.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention improves the operating mechanism of this prior art roof system.

For this purpose, the roof system includes a fourth connection on the lever, the fourth connection being positioned closer to the third connection than to the first connection— preferably arranged in the neighborhood of or proximate to the third connection—and connecting the lever to the guiding slide when the third connection is disconnected from the guiding slide during a movement of the front edge of the closure in a vertical upward direction.

By using two connections between the lever of the front device and the guiding slide which are taking over from each other, it is possible to reach a higher lift of the panel front side with the same height of the operating mechanism or lower the operating mechanism with the same lifting height.

This is particularly possible if the fourth connection is positioned at a lower level than the third connection at least when the closure is in its closed position.

In this case, the upper third connection can be placed relatively high on the lever establishing a favorable leverage and still obtain a proper lifting height.

This can be maximized if the fourth connection is positioned at a lower level than a bottom of the stationary guide rail in the closed position of the closure.

Preferably, the fourth connection is positioned substantially below the third connection.

There is hardly any change in stability then if the third and fourth connection take over from each other.

If the fourth connection is positioned closer to the third connection than to the first connection, this also leads to a small change in stability.

A simple but effective way of obtaining the take-over when the third connection includes a third pin on the lever and a first guide curve in the guiding slide, is by making the first guide curve open on its upper end such that the third pin can leave the first guide curve when the front edge of the closure is moved to its upper position.

Reversely, if the fourth connection includes a fourth pin on the lever and a second guide curve in the guiding slide, the second guide curve may be open in its lower end such that the fourth pin can enter the second guide curve when the third pin is leaving the first guide curve.

Preferably, the third and fourth connections are such that the fourth pin has entered the second guide curve before the third pin has left the first guide curve so that the fourth pin takes over from the third pin in a gradual manner, and vice versa.

In this way the take over is reliable and a stable support of the panel is provided in any position of the operating mechanism.

The second connection may connect the lever to a sliding member which is guided in the stationary guide rail.

Alternatively, the second connection may include a cam on the lever and a locator in the stationary guide rail, which locator comprises a curve having a downward curve portion, the cam being positioned in the locator in forward positions of the closure and is moved to the downward curve portion when the front edge of the closure is moved in a vertical upward direction.

This is another or additional manner of improving the lifting height of the lever without requiring an increase in height of the operating mechanism, especially of the guiding slide thereof. The rotational height cannot only be improved by lowering the intermediate connection between the lever and the guiding slide during the upward rotation, but also by lowering the position of the lower, second connection between the lever and the guiding slide.

The downward curve portion of the second connection is preferably in downward and rearward direction and connects to a guide groove in the stationary guide rail.

The second connection and third connection are preferably on opposite sides of the lever, the second connection being on the side of the lever facing away from the guiding slide.

In this manner, there is sufficient room for the locator and its connection to the cam of the second connection, without being hindered by the guiding slide.

Preferably, a guide cam is on the same side of the lever as the second connection, the guide cam being in engagement with a stationary guide curve.

This guide cam and stationary guide curve can determine the horizontal position of the lever during its lifting movement and release the lever with respect to the stationary part if the panel is made to slide in horizontal direction.

For this purpose, the stationary guide curve has a substantially vertical front portion and a substantially horizontal rear portion.

If the front portion slightly deviates from the vertical, the lever will make some horizontal movement during rotation, either forward or rearward, whatever is desired.

Preferably, the third connection between the lever and the guiding slide includes a pin-curve connection, for example a pin on the lever and a guide curve in the guiding slide.

BRIEF DESCRIPTION OF THE DRAWINGS

Further details and advantages of the invention will become clearer from the following description of embodiments of the roof system with reference to the drawings.

DETAILED DESCRIPTION OF THE ILLUSTRATIVE EMBODIMENTS

Figure 1:
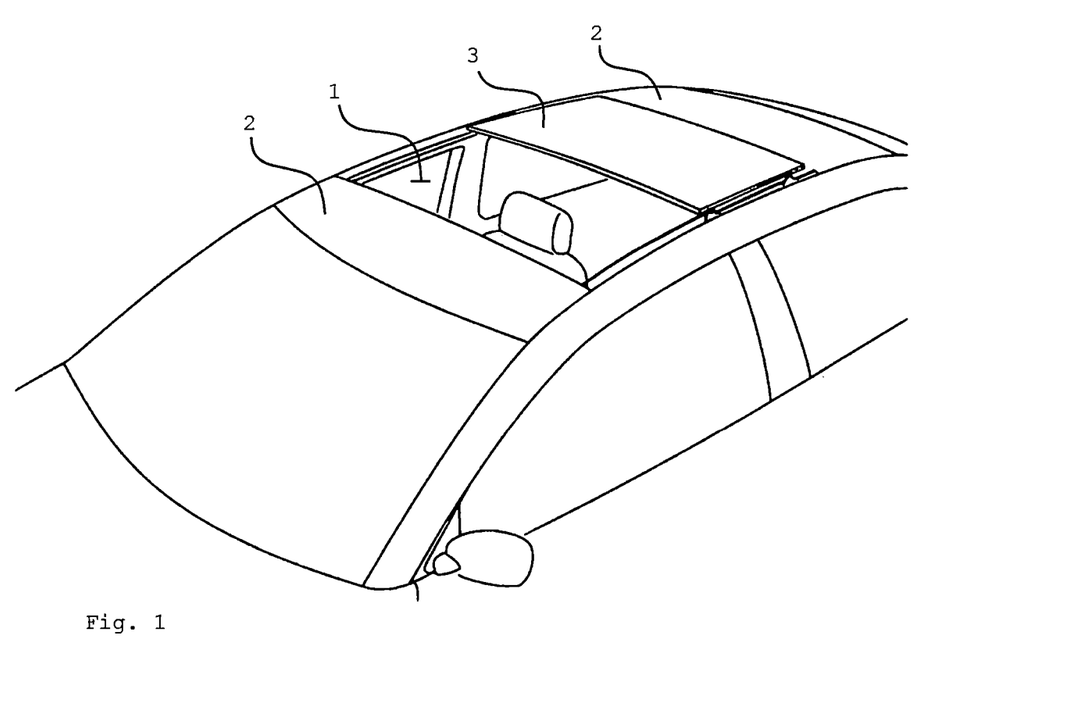
FIG. 1 is a schematic perspective view of a part of a vehicle with an embodiment of the roof system in an open position.

FIG. 1 shows a part of a vehicle, in particular an automobile or passenger car, which comprises a roof opening 1 defined in a (stationary) roof part 2. A closure, here in the form of a panel 3, is movable between a closed position (not shown) in which it closes roof opening 1 and is flush with roof part 2, and an open position (FIG. 1) in which it opens roof opening 1 and in which it is positioned at least partially above roof part 2, here the fixed roof part adjoining the rear of roof opening 1.

As is known per se such a roof system (which is also known as a top slider roof) could comprise additional elements, such as for example a tiltable wind deflector positioned ahead of roof opening 1, or further movable or stationary panels, for example in a position behind panel 3 when it is in its closed position. In fact, in the present embodiment, the roof part behind roof panel 3 is formed by a roof panel 3' which may be a stationary roof panel or a movable panel.

Figures 2, 3:
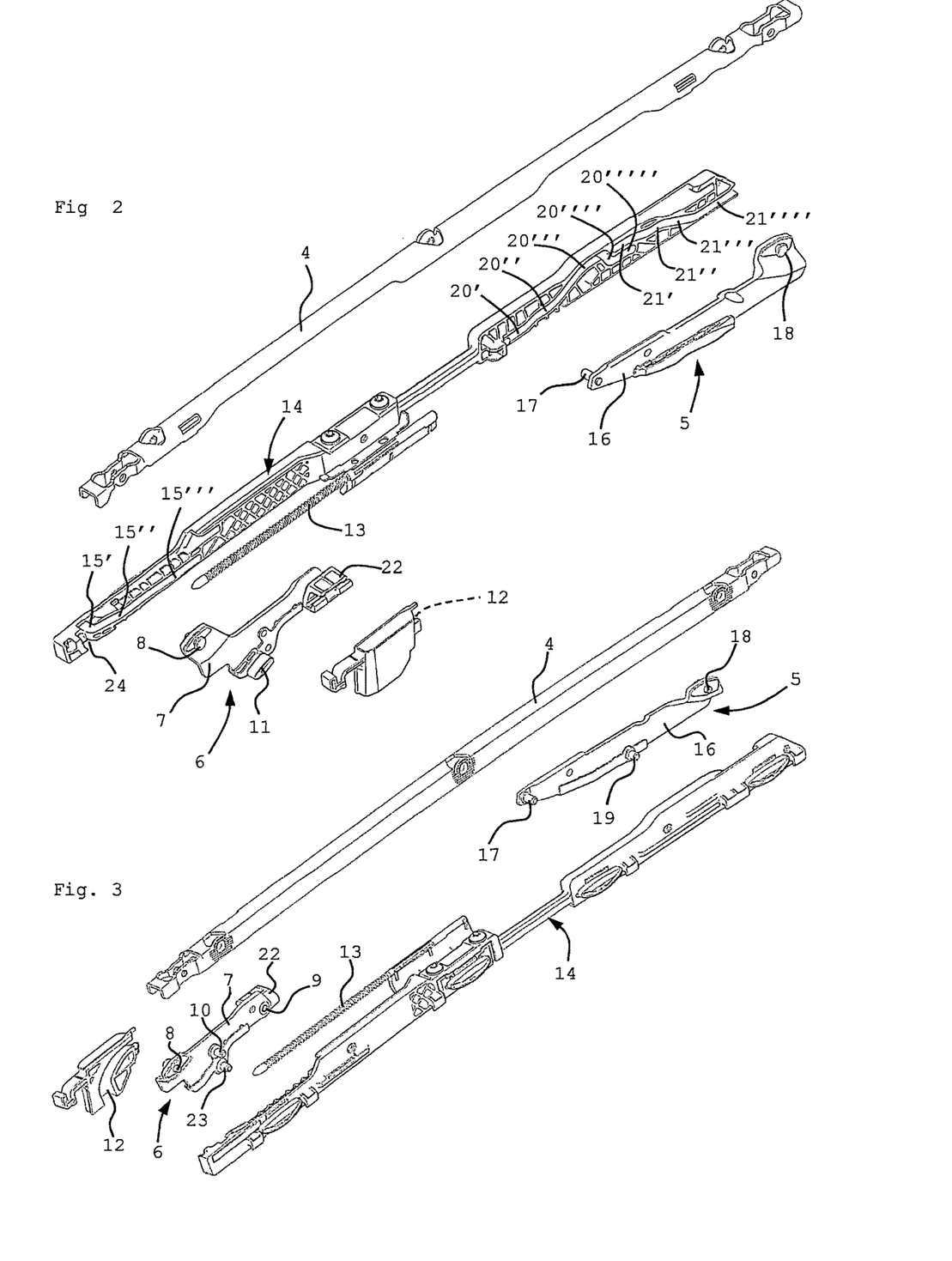
FIG. 2 is an enlarged simplified exploded view of the parts of the operating mechanism of the roof system of FIG. 1 without guide rail.
FIG. 3 is an exploded view showing the parts of the operating mechanism of FIG. 2 from the other side.
Figures 4A, 4B, 4C:
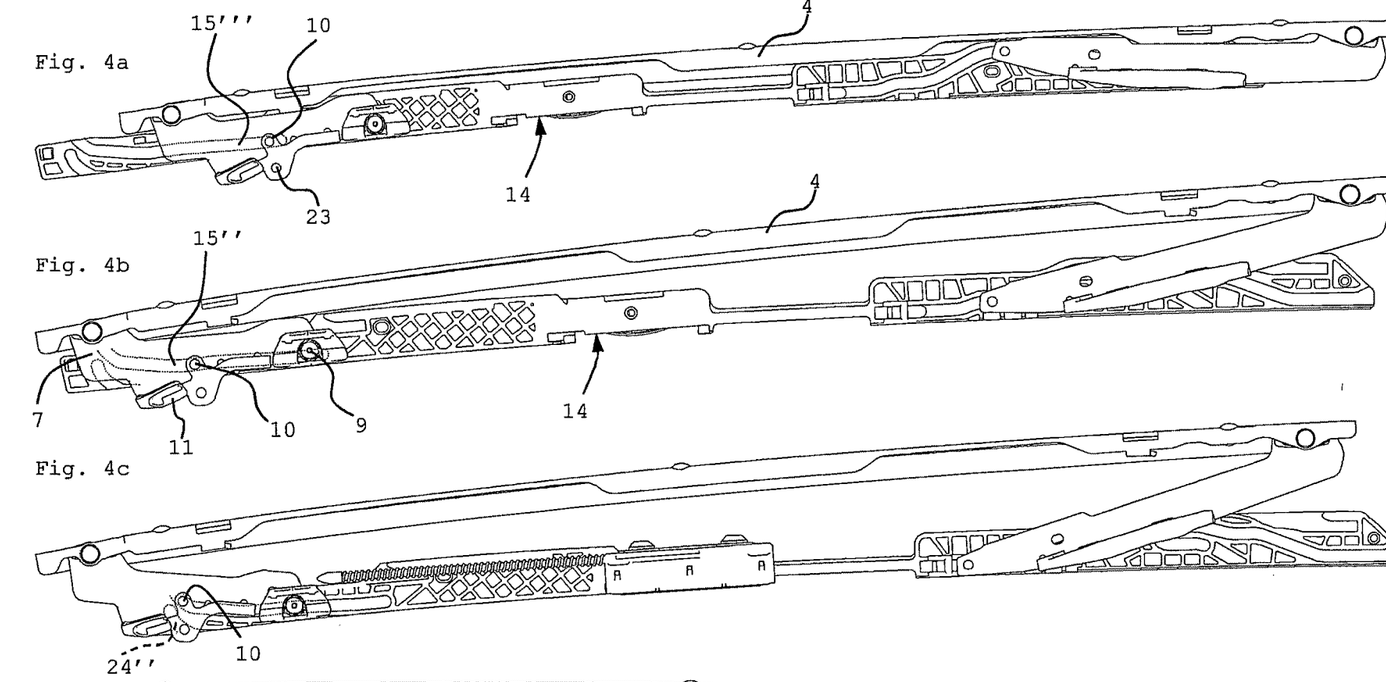
FIGS. 4a-4d are longitudinal sectional views of the operating mechanism of FIG. 3, in four different positions.
Figure 4D:
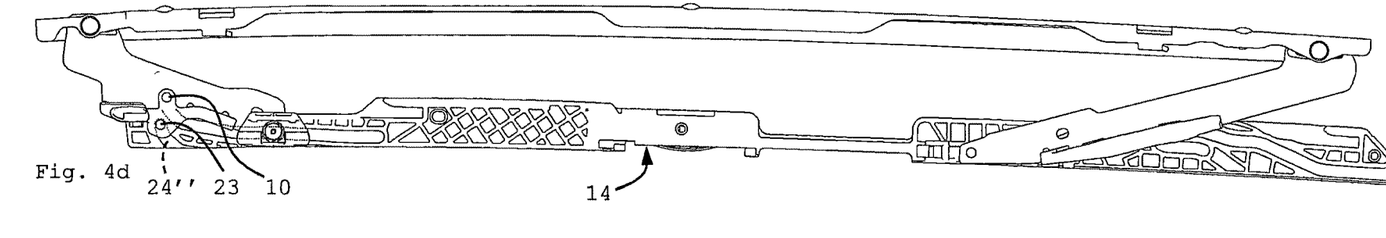
Figure 5A:
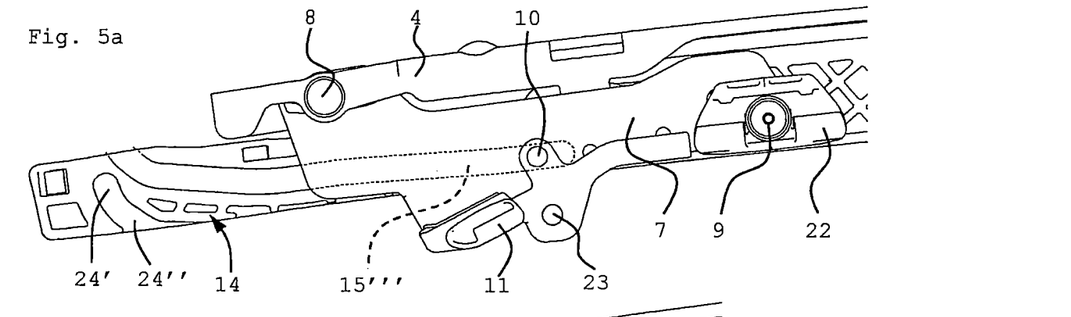
FIGS. 5a-5d are enlarged views showing a front portion of the operating mechanism of FIG. 4 in the same four positions.
Figures 5B, 5C:
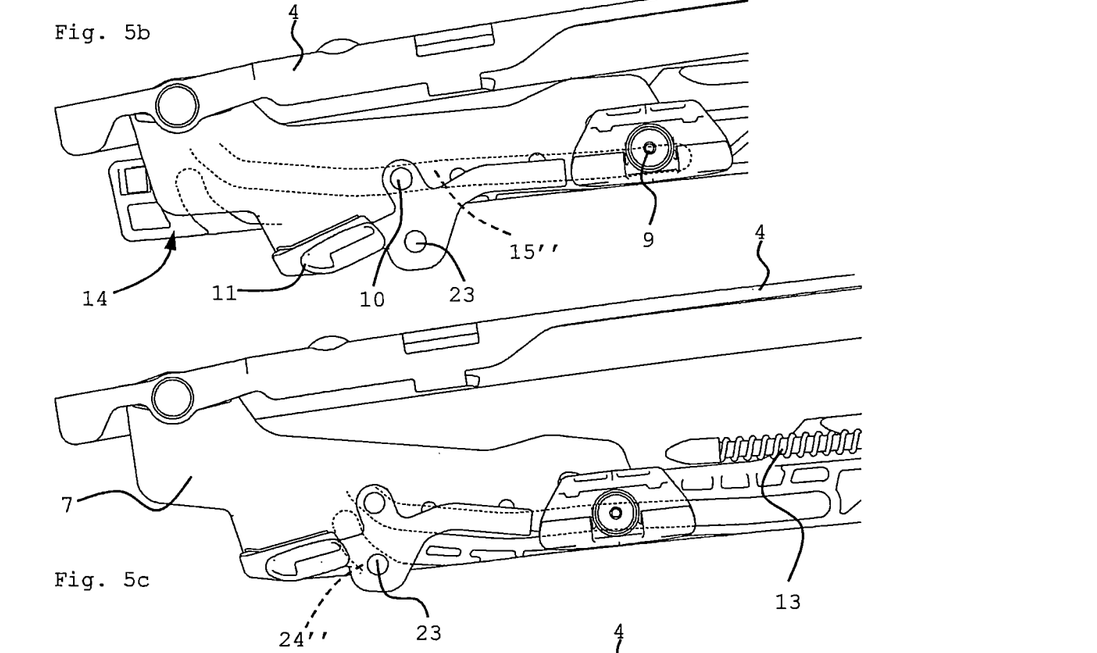
Figure 5D:
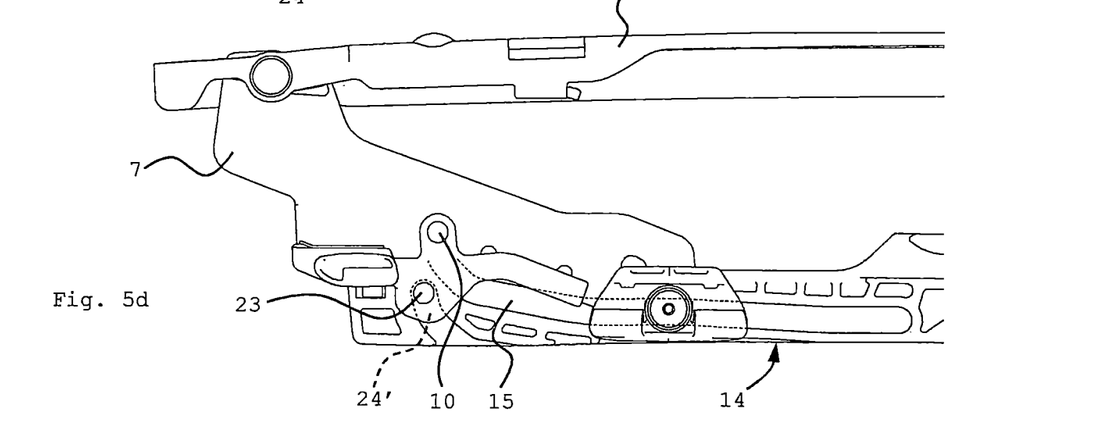
Figure 6:
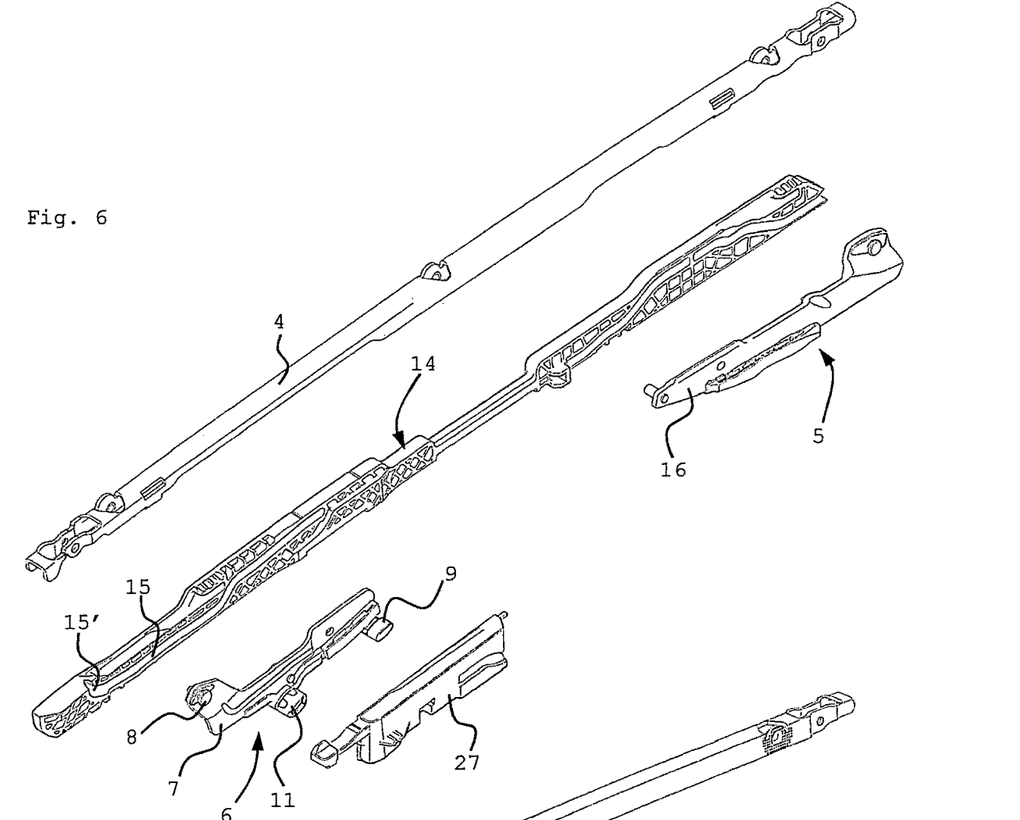
FIGS. 6 and 7 are views corresponding to those of FIGS. 2 and 3 but showing a second embodiment of the operating mechanism.
Figure 7:
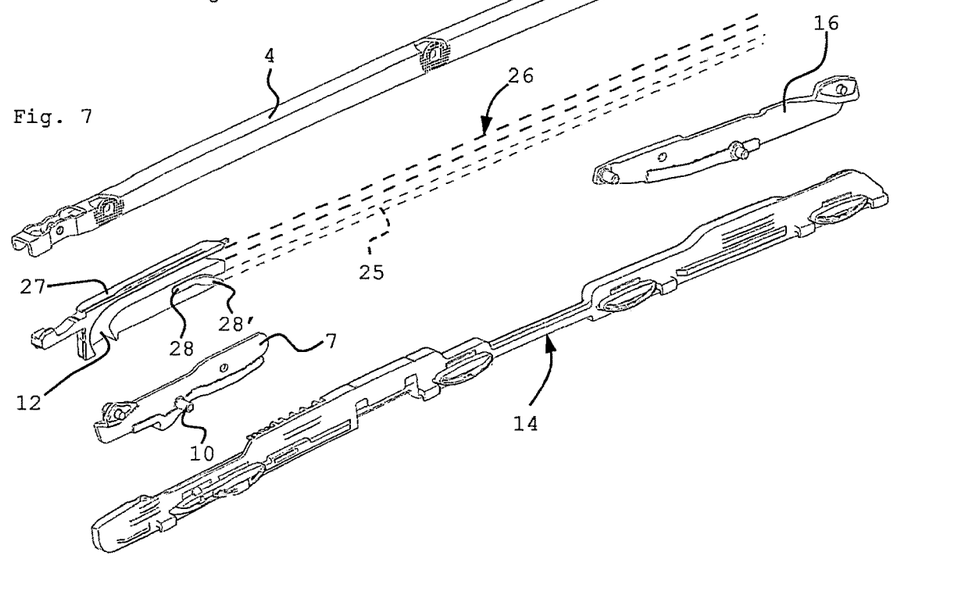

The movement of panel 3 from the closed position towards an open position as illustrated in FIG. 1 is governed by an operating mechanism, the parts of which have been illustrated in FIGS. 2 and 3 (first embodiment) and FIGS. 6, 7 (second embodiment) and the operation of which is illustrated schematically in FIGS. 4 and 5, and FIGS. 8, 9, respectively. It is noted that FIGS. 2, 6 represent embodiments of an operating mechanism on one longitudinal side of the roof construction, i.e., one longitudinal side of panel 3, and it should be understood that a corresponding operating mechanism normally will be provided at the opposite longitudinal side, generally in mirror image, as is shown in FIGS. 3, 7.

FIGS. 2, 3 show the parts of a first embodiment of the operating mechanisms. Each mechanism is connected to panel 3 through a closure support, in this case a panel bracket 4 which is fixed to the lower side of panel 3 near the longitudinal edge thereof in any known manner, for example through encapsulation or through attachment to another encapsulated part. The operating mechanisms include a first or rear device 5 and a second or front device 6

The second or front device 6 includes a lever 7. This lever comprises, a first or upper pivotal connection 8, pivotally connecting lever 7 to panel bracket 4 of panel 3, a second or lower pivotal connection, here including a second, pivot pin 9 and a third or intermediate guide connection, here including a third pin 10. In the vicinity of pin 10 of the intermediate guide connection, but on the other side of lever 7, i.e., on the side opposite to parts 8, 9 and 10, there is arranged a guide member 11 in the form of a guide cam. This guide member 11 is adapted to be in sliding engagement with a stationary guide curve which, for the greater part, is formed by a stationary guide rail which is attached to the vehicle roof, either directly or through a frame. The guide rail extends at least along roof opening 1 in longitudinal direction of the vehicle. The main part of the rear portion of the stationary guide curve will generally be formed by flanges of the stationary guide rail. The stationary guide curve locks the horizontal movement of panel 3 when it is in its forward position and locks the vertical movements of panel 3 when it is in the rearward position.

The stationary guide curve includes a rear portion extending within the guide rail (parallel to panel 3 when in closed position), and a front portion 12 extending substantially at an angle to the rear portion.

The stationary guide rail is not shown in the drawings. The stationary guide rail is shown in the drawings of U.S. Pat. No. 8,857,903 the whole contents are incorporated herein by reference thereto.

In FIGS. 2, 3 it is shown that front portion 12 of the stationary guide curve is made in a plastic part (which is attached to the stationary guide rail).

The intermediate guide connection 10 effects co-operation with a guiding slide 14 which will generally be connected directly to a driving mechanism, for example an electric motor driving a push and pull cable 13 (FIGS. 2 and 3) and therefore also acts as a driving slide. The guiding slide 14 is slidebly guided in the stationary guide rail and determines the movements of panel 3. The guiding slide 14 includes a first, here front guide curve, e.g., a guide slot, 15 in which pin 10 of the intermediate guide connection slidably engages. The front guide curve 15 includes an upwardly inclined open front portion 15', a lower front portion 15" and a rear portion 15'". The extent of front guide curve 15 determines a part of the vertical movements of the front edge of panel 3.

The first or rear device 5 of the operating mechanism includes a lever 16 (FIGS. 2 and 3). This lever 16 comprises a lower pivot axis or pivot pin 17, an upper pivotal connection 18 and an intermediate guide connection 19. Both levers 7 and 16 extend in opposite directions, that is front lever 7 extends from its connection to panel 3 backwardly and downwardly, whereas rear lever 16 extends forwardly and downwardly from panel 3. As a result, both levers can be controlled by the same guiding slide 14 having a relatively short length, whereas levers 7 and 16 connect to panel 3 at a position near the front or rear edge respectively. This close connection to the front and rear edge of panel 3 makes the support of panel 3 very stable.

The slidable connection between rear lever 16 of first device 5 and guiding slide 14 is accomplished by the engagement of pin 17 and of a pin of intermediate guide connection 19 with a rear guide curve. The rear guide curve in the embodiment as shown in FIG. 2 includes two separate guide curves or slots 20, 21, one for pin 17 and one for intermediate guide connection 19 as the paths of movement thereof do not overlap. The guide curve 20 includes a lower front portion 20', a rearwardly and upwardly inclining portion 20", a high portion 20''', an almost vertical portion 20'''' and a lower rear portion 20'''''. The pin 17 slides only in portions 20', 20" and 20''' during use. The other portions are only used for mounting rear lever 16 to guiding slide 14. The guide curve 21 includes a substantially horizontal front portion 21', a second slightly lower substantially horizontal portion 21", a rearwardly and downwardly inclining portion 21''', and a substantially horizontal rear portion 21''''.

The pivot pin 9 according to the operating mechanism of the present roof system is not engaged with guiding slide 14 but is supported by a separate auxiliary sliding member 22 (see FIGS. 2, 4 and 5). This sliding member 22 is guided directly in the guide rail, that is in a guide channel (not shown here) thereof.

The above description more or less describes the operating mechanism according to U.S. Pat. Nos. 8,857,903 and of 7,828,376, the contents of which are also incorporated herein by reference thereto. The following description relates to features which are novel with respect to this prior art.

FIGS. 3, 4 and 5 show that front lever 7 comprises in the neighborhood of or promimat to its pin 10 of the third or intermediate guide connection a fourth pivotal connection including pin 23 that is either free from any connection or is guided by a second guide curve 24 (FIGS. 2, 4 and 5) in guiding slide 14 in order to guide and support lever 7 at least when pin 10 has left open front portion 15' of first guide curve 15, in which position pin 10 is not supported in any direction. A front portion 24' of guide curve 24 is almost vertical to lock front lever 7 in horizontal direction with respect to guiding slide 14 and a sloping rear portion 24" in order to lift pin 23 further when guiding slide 14 moves with respect to lever 7. There is a small overlap in the take-over between pins 10 and 23, but if pin 23 is disengaged from guide curve 24 again, intermediate guide connection 10, 15 takes over the control of front lever 7.

As is shown in FIGS. 4 and 5, pin 23 of the fourth connection 23, 24 is positioned at a lower level on lever 7 than pin 10 of the third connection 10, 15 at least when panel 3 is in its closed position, but in this case in all positions of lever 7. It is also clear that fourth pin 23 is positioned (much) closer to third pin 10 than to first or upper pivotal connection 8. In this case, fourth pin 23 is positioned substantially below third pin 10 in all positions of lever 7. Both pins 10, 23 are positioned substantially in the middle between first and second pivotal connections 8 and 9. As is shown in FIG. 5a, fourth pin 23 is positioned just behind guide cam 11 albeit on the opposite side of lever 7.

FIGS. 4 and 5 show the operation of front device 6.

In FIGS. 4a, 5a, panel 3 is in its closed position. Third pin 10 is near the rear end of guide curve 15, in particular of rear portion 15'''. Fourth pin 23 is positioned at a level below the bottom of the guide rail (not shown but guiding slide 14 is guided by the bottom of the guide rail).

In FIG. 4b, 5b, guiding slide 14 has been moved by drive cable 13 (FIG. 5c) a distance rearwardly. Due to the engagement of guide member 11 with substantially vertical front portion 12 of the stationary guide curve (FIG. 3), lever 7 of front device 6 remains substantially in its position in horizontal direction. Third pin 10 has moved to lower front portion 15" of guide curve 15 and as a result lever 7 has been rotated slightly upwardly around second pivotal connection 9.

In FIG. 4c, 5c, third pin 10 has arrived at open front portion 15' of guide curve 15, while fourth pin 23 has entered rear portion 24" of guide curve 24.

FIG. 4d, 5d shows the position of panel 4 in which the front side of panel 3/panel bracket 4 has reached its highest position. Fourth pin 23 has reached the upper end of guide curve 24, while third pin 10 has left guide curve 15 through its open front end. Due to fourth pin 23/guide curve 24 front lever 7 has reached a high position without an increase in height of guiding slide 14 or a less favourable position of third pin 10.

FIGS. 6-9 show a second embodiment of the operating mechanism. This operating mechanism is very similar to the first embodiment. Like parts are indicated with like reference numerals. Different in this second embodiment is that the second connection of lever 7 does not include a pin pivotally engaging an auxiliary sliding member 22 which slides within a groove of the stationary guide rail but includes a cam 9 that is engaged directly in a groove 25 of a stationary guide rail 26, which includes a locator 27.

Figure 8A:
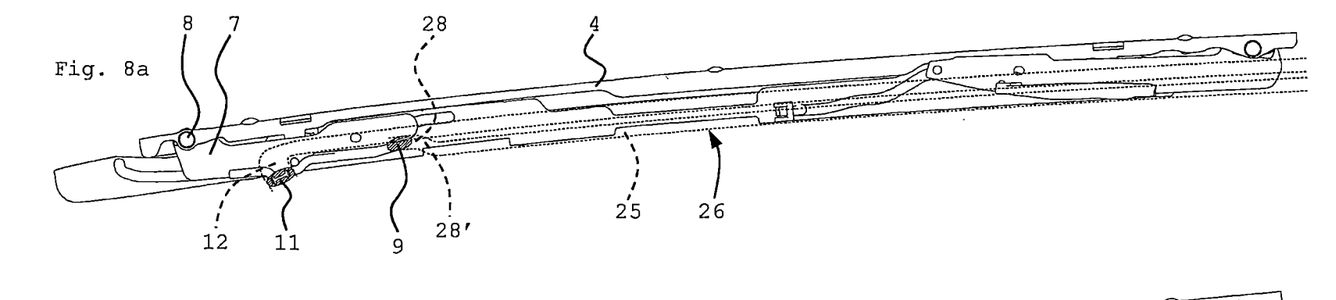
FIGS. 8a-8c are views corresponding to those of FIGS. 4a, 4b and 4d but showing the second embodiment of FIGS. 6 and 7.
Figure 8B:
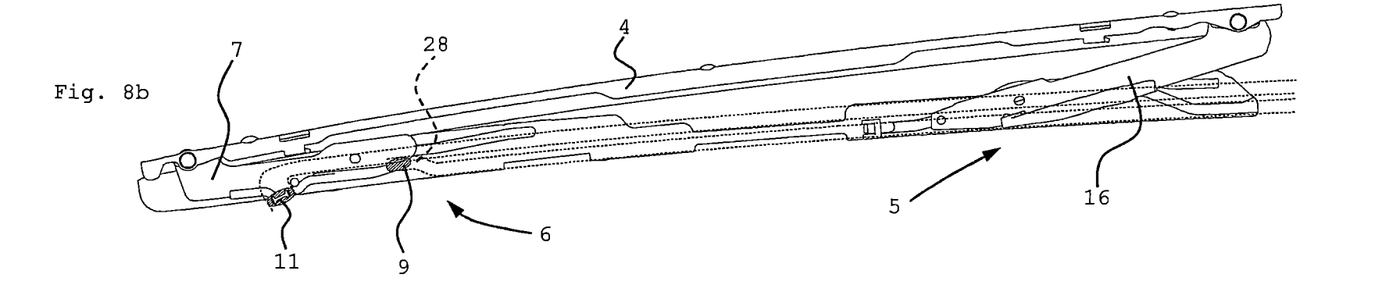
Figure 8C:
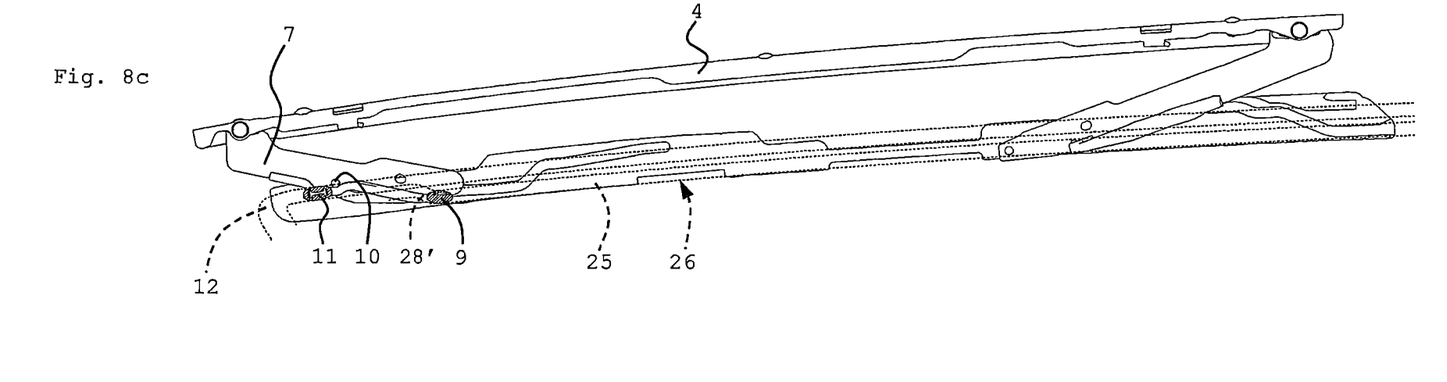
Figure 9A:
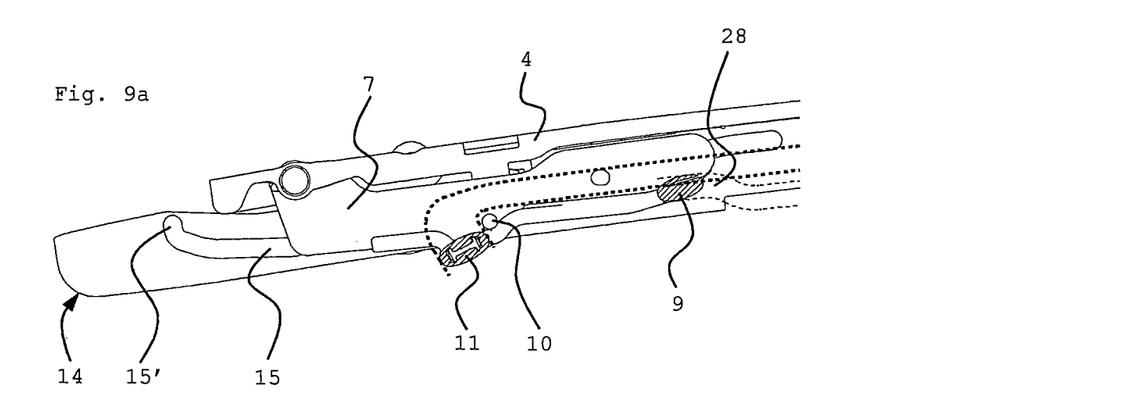
FIGS. 9a and 9b are views corresponding to those of FIGS. 5a and 5d but showing the second embodiment of FIGS. 6 and 7.
Figure 9B:
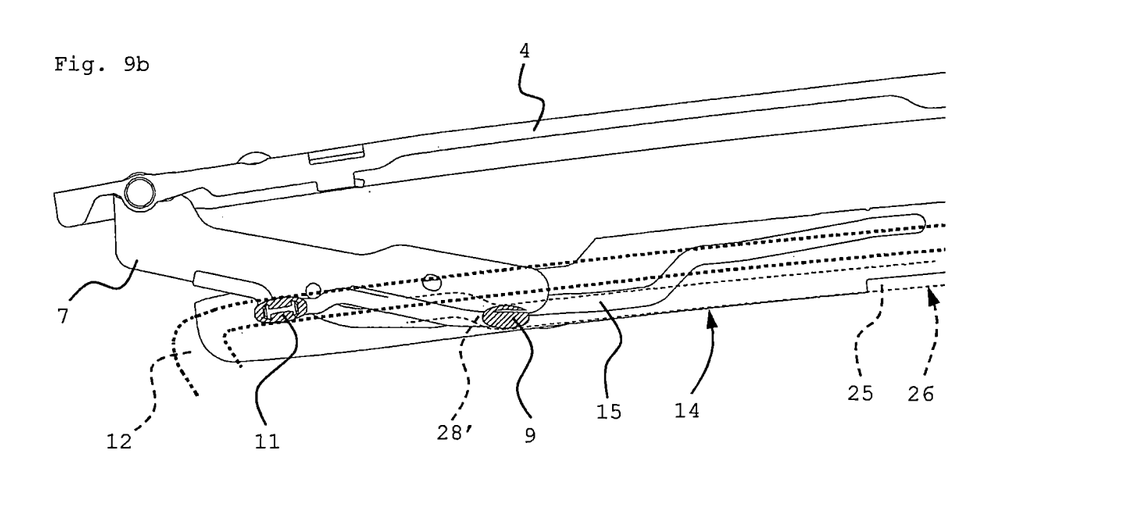

Locator 27 is positioned at the front end of groove 25 of guide rail 26 and is in this case the locator that also forms front portion 12 of the stationary guide curve for guide cam 11. The guide rail 26, also forming the rear portion of the stationary guide curve, is shown in dashed lines in FIG. 7. Locator 27 comprises a guide groove 28 for the cam 9 of second connection 9, 28 including a downwardly and rearwardly inclined portion 28'. In forward positions of guiding slide 14, cam 9 of the second connection 9, 25, 28 is positioned substantially at the high front end of groove portion 28 (FIG. 8a/9a, 8b). It moves rearwardly and downwardly to groove 25 in guide rail 26 (FIG. 8c, 9b) when lever 7 is allowed (by guide cam 11) and forced to move rearwardly by the engagement of pin 10 of the third connection of lever 7 in substantially vertical front portion 15' of guide curve 15 in guiding slide 14. By this downward movement of cam 9 of the second connection the height difference between second connection 9, 25, 28 and third connection 10, 15 becomes greater in rearward positions of lever 7 and therefore the inclination of lever 7 becomes larger or the same inclination of lever 7 can be obtained with a lower packaging of the operating mechanism. Of course, this obtained by the fact that the lowest, forward position of lever 7 is reached with cam 9 of the second connection in a higher position, thus enabling a downward movement of cam 9 of the second connection. This cam 9 of the second connection could also be combined with pin 23 of fourth connection 23, 24.

From the foregoing it will be clear an aspect of the invention provides an operating mechanism for a roof system having a greater lifting height at the front of the panel, while maintaining a low package height, or a lower packaging with the same lifting height.

The invention is not limited to the embodiment shown in the drawings and described above, which may be varied in different manners within the scope of the appended claims. Features of different embodiments may be combined in other ways.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A roof system for a vehicle having a roof opening in a roof part thereof, comprising:
    at least a closure which is movable between a closed position in which it closes the roof opening and an open position in which it opens the roof opening and is positioned at least partially above an adjoining portion of the roof part,
    a stationary guide rail at each longitudinal side of said roof opening, suitable for slidably guiding an operating mechanism that operates the closure in a longitudinal direction of the vehicle, said operating mechanism comprising:
    a first device for moving the rear edge of the closure towards a raised position relative to the closed position and above the adjoining roof part,
    a second device including a lever for moving the front edge of the closure in a vertical direction; and
    a guiding slide which is slidably accommodated in each guide rail and is drivable by a drive member in order to move the closure both in vertical and in horizontal direction through the first and second devices,
    wherein the lever comprises,
    at a first end, a first pivotal connection to the closure,
    remote from the first end, spaced second and third connections, at least the third connection connecting the respective lever at least to the guiding slide in order to enable control of the movements of said lever, and
    a fourth connection on the lever, the fourth connection being positioned closer to the third connection than to the first connection and connecting the lever to the guiding slide when the third connection is disconnected from the guiding slide during a movement of the front edge of the closure in a vertical upward direction.

2. The roof system according to claim 1, wherein the fourth connection is positioned at a lower level than the third connection at least when the closure is in its closed position.

3. The roof system according to claim 2, wherein the fourth connection is positioned at a lower level than a bottom of the stationary guide rail in the closed position of the closure.

4. The roof system according to claim 2, wherein the fourth connection is positioned substantially below the third connection.

5. The roof system according to claim 2, wherein the fourth connection is arranged proximate to the third connection.

6. The roof system according to claim 1, wherein the third connection includes a third pin on the lever and a first guide curve in the guiding slide, the first guide curve being open on its upper end such that the third pin can leave the first guide curve when the front edge of the closure is moved to its upper position.

7. The roof system according to claim 5, wherein the fourth connection includes a fourth pin on the lever and a second guide curve in the guiding slide, the second guide curve being open in its lower end such that the fourth pin can enter the second guide curve when the third pin is leaving the first guide curve.

8. The roof system according to claim 7, wherein the third and fourth connections are such that the fourth pin has entered the second guide curve before the third pin has left the first guide curve so that the fourth pin takes over from the third pin in a gradual manner, and vice versa.

9. The roof system according to claim 1, wherein the second connection connects the lever to a sliding member which is guided in the stationary guide rail.

10. The roof system according to claim 1, wherein the lever extends from the first pivotal connection mainly in rearward direction.

11. A roof system for a vehicle having a roof opening in a roof part thereof, comprising:
    at least a closure which is movable between a closed position in which it closes the roof opening and an open position in which it opens the roof opening and is positioned at least partially above an adjoining portion of the roof part,
    a stationary guide rail at each longitudinal side of said roof opening, suitable for slidably guiding an operating mechanism that operates the closure in a longitudinal direction of the vehicle, said operating mechanism comprising:
    a first device for moving the rear edge of the closure towards a raised position relative to the closed position and above the adjoining roof part,
    a second device including a lever for moving the front edge of the closure in a vertical direction; and
    a guiding slide which is slidably accommodated in each guide rail and is drivable by a drive member in order to move the closure both in vertical and in horizontal direction through the first and second devices,
    wherein the lever comprises,
    at a first end, a first pivotal connection to the closure,
    remote from the first end, spaced second and third connections, the third connection slidably connecting the respective lever at least to the guiding slide in order to enable control of the movements of said lever, the second connection connecting the lever to the stationary guide rail, the second connection including a cam on the lever and a locator in the stationary guide rail, which locator comprises a curve having a downward curve portion, the cam being positioned in the locator in forward positions of the closure and is moved to the downward curve portion when the front edge of the closure is moved in a vertical upward direction.

12. The roof system according to claim 11, wherein the downward curve portion of the second connection is in downward and rearward direction and connects to a guide groove in the stationary guide rail.

13. The roof system according to claim 11, wherein the second connection and third connection are on opposite sides of the lever, the second connection being on the side of the lever facing away from the guiding slide.

14. The roof system according to claim 11, wherein a guide cam is on the same side of the lever as the cam of the second connection, the guide cam being in engagement with a stationary guide curve.

15. The roof system according to claim 14, wherein the stationary guide curve has a substantially vertical front portion and a substantially horizontal rear portion.

16. The roof system according to claim 11, wherein the third connection between the lever and the guiding slide includes a pin-curve connection.

\* \* \* \* \*